United States Patent [19]

Yamamoto et al.

[11] 3,865,827

[45] Feb. 11, 1975

[54] PROCESS FOR PRODUCING QUANAZOLINONE DERIVATIVES

[75] Inventors: Michihiro Yamamoto, Toyonaka; Kikuo Ishizumi, Ikeda; Kazuo Mori, Kobe; Masao Koshiba; Shigeho Inaba, both of Takarazuka; Hisao Yamamoto, Nishinomiya, all of Japan

[73] Assignee: Sumimato Chemical Company, Limited, Osaka, Japan

[22] Filed: Dec. 13, 1971

[21] Appl. No.: 207,541

[30] Foreign Application Priority Data

Dec. 28, 1970 Japan .............................. 45-129980

[52] U.S. Cl. .................... 260/251 QA, 260/247.1, 260/247.2 A, 260/256.4 Q, 260/256.5 R, 260/294.8 R, 260/294.8 G, 260/326.4, 260/326.47, 260/332.2 R, 260/347.3, 260/562 B, 260/999

[51] Int. Cl. ............................................ C07d 51/48

[58] Field of Search ........... 260/251 QA, 251 QB, 260/256.4 Q, 256.5 R

[56] References Cited

UNITED STATES PATENTS 3,573,308 3/1971 Ning et al. .......................... 260/251

*Primary Examiner*—Donald G. Daus
*Assistant Examiner*—Raymond V. Rush
*Attorney, Agent, or Firm*—Stevens, Davis, Miller & Mosher

[57] ABSTRACT

3,4-Dihydro-2(1H)-quinazolinone derivatives, which have valuable therapeutic activities, such as 3-methyl-4-ethoxy-4-phenyl-6-chloro-3,4-dihydro-2(1H)-quinazolinone and 3-n-propyl-4-hydroxy-4-phenyl-6-chloro-3,4-dihydro-2(1H)-quinazolinone, are produced according to a process in which a trihalogenoacetanilide derivative is reacted with an amine or a salt thereof and the resulting compound is reacted with an alcohol or water.

5 Claims, No Drawings

PROCESS FOR PRODUCING QUANAZOLINONE DERIVATIVES

The present invention relates to a novel process for producing quinazolinone derivatives. More particularly, the invention pertains to a novel process for producing 3,4-dihydro-2(1H)-quinazolinone derivatives represented by the formula,

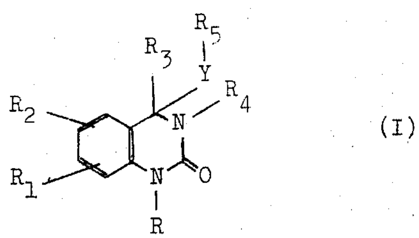

wherein R is hydrogen, $C_{1-4}$ alkyl, $C_{3-5}$ alkenyl, ($C_{3-6}$ cycloalkyl) $C_{1-4}$ alkyl or ($C_{1-4}$ alkoxy) $C_{1-4}$ alkyl; $R_1$ and $R_2$ each signify hydrogen, $C_{1-4}$ alkyl, $C_{1-4}$ alkoxy, nitro, trifluoromethyl, $C_{1-4}$ alkylthio, $C_{1-4}$ alkylsulfonyl or halogen; $R_3$ is phenyl, halophenyl, $C_{1-4}$ alkylphenyl, $C_{1-4}$ alkoxyphenyl, trifluoromethylphenyl, $C_{3-6}$ cycloalkyl, $C_{5-6}$ cycloalkenyl, pyridyl, furyl, thienyl, pyrrolyl or naphthyl; $R_4$ is $C_{1-4}$ alkyl, $C_{3-5}$ alkenyl, aralkyl, ($C_{3-6}$ cycloalkyl) $C_{1-4}$ alkyl, $C_{3-6}$ cycloalkyl, ($C_{1-4}$ alkoxy) $C_{1-4}$ alkyl, ($C_{1-4}$ alkylthio) $C_{1-4}$ alkyl, ($C_{2-3}$ alkanoyloxy) $C_{1-4}$ alkyl, phenyl, halophenyl, $C_{1-4}$ alkylphenyl, $C_{1-4}$ alkoxyphenyl, trifluoromethylphenyl, pyridyl,

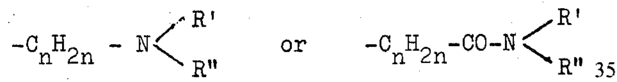

(wherein $n$ is an integer of 1 to 4 and R' and R'' each signify $C_{1-4}$ alkyl, provided that R' and R'' may form together with the adjacent nitrogen atom an unsubstituted or optionally substituted 5- or 6-membered heterocyclic ring, which may further contain a hetero atom; $R_5$ is the same as defined in $R_4$ or hydrogen; and Y is $>N-R_6$ (wherein $R_6$ is hydrogen, $C_{1-4}$ alkyl, aralkyl or ($C_{1-4}$ alkoxy) $C_{1-4}$ alkyl), oxygen or sulfur. In the compounds represented by the formula (I), the term "alkyl" means both straight and branched chain aliphatic hydrocarbon radicals, and $C_{1-4}$ alkyl includes, for example, methyl, ethyl, n-propyl, isopropyl, n-butyl, isobutyl, and tertiary-butyl; $C_{3-5}$ alkenyl includes, for example, allyl, methallyl, 2-butenyl, 3-butenyl and 3,3-dimethyl allyl; $C_{3-6}$ cycloalkyl includes, for example, cyclopropyl, cyclobutyl, cyclopentyl, cyclohexyl, methylcyclopropyl and dimethylcyclopropyl; $C_{1-4}$ alkoxy includes, for example, methoxy, ethoxy, n-propoxy, isopropoxy, n-butoxy and tertiary-butoxy; $C_{1-4}$ alkylthio includes, for example, methylthio, ethylthio, isopropylthio and n-butylthio; the term "halogen" comprehends all halogens (e.g. fluorine, chlorine, bromine and iodine); $C_{5-6}$ alkenyl includes, for example, cyclopentenyl and cyclohexenyl; aralkyl includes, for example, benzyl, phenethyl, chlorobenzyl and fluorobenzyl; and $C_{2-3}$ alkanoyloxy includes, for example, acetoxy and propionyloxy. The alkylene represented by $-C_nH_{2n}-$ is a straight or branched chain alkylene group having 1 to 4 carbon atoms, and includes, for example, methylene, ethylene, 1-methylethylene, 2-methylethylene, trimethylene, 1-methyltrimethylene and 2-methyltrimethylene, R' and R'' may form together with the adjacent nitrogen atom a hetero cyclic ring, and the hetero cyclic group includes, for example, pyrrolidino, piperidino and morpholino groups and substituted derivatives thereof. The quinazolinone derivatives represented by the aforesaid formula (I) which are the derivatives produced by the claimed process have valuable pharmacological properties such as anti-inflammatory and analgesic, activities, and they are also useful as intermediates for preparing other quinazoline derivatives. Thus, the present invention offers a novel and useful process for producing commercially such valuable compounds.

A process for producing 3-methyl-3,4-dihydro-2(1H)-quinazoline derivatives has heretofore been described, e.g., they are prepared by reacting a 2-aminobenzophenone derivative with methylisocyanate. (W. Metlesics et al., J. Org. Chem,. Vol. 31, page 1007 (1966))

Contrary to the procedure, we have found unexpectedly that 3,4-dihydro-2(1H)-quinazolinone derivatives of the formula (I) can be smoothly and economically prepared in high yield and in high purity by reacting a trihalogenoacetanilide derivative of the formula,

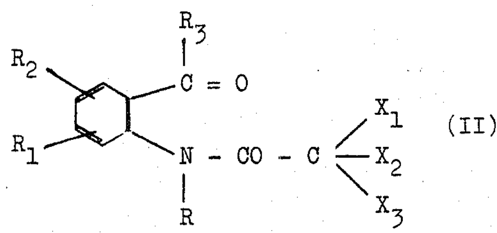

wherein $X_1$, $X_2$ and $X_3$ are the same or different halogen atoms; and R, $R_1$, $R_2$ and $R_3$ are as defined above in the formula (I), with an amine of the formula, $$R_4 - NH_2 \qquad (III)$$

wherein $R_4$ is as defined above in the formula (I), or a salt therof to produce a compound of the formula,

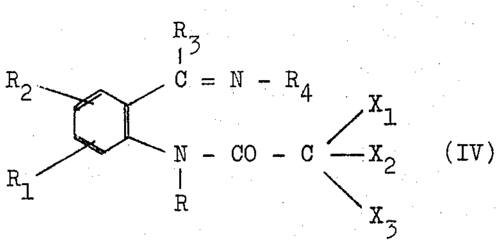

wherein R, $R_1$, $R_2$, $R_3$, $R_4$, $X_1$, $X_2$ and $X_3$ are as defined above, and then reacting the above compound with a compound of the formula, $$R_5 - YH \qquad (V)$$

wherein $R_5$ and Y are as defined above in the formula (I), or a salt thereof.

Such process for converting a trihalogenoacetanilide derivative into a 3,4-dihydro-2(1H)-quinazolinone derivative has not heretofore been described or suggested in any literature. This novel and useful process thus differs remarkably from the known method and represents an improvement thereover.

In order to accomplish the object of the present invention, a trihalogenoacetanilide derivative of the aforesaid formula (II) is reacted with an amine of the formula (III) or a salt thereof in the presence of a solvent and the compound thus obtained of the formula (IV), which may be optionally isolated, is then reacted with a compound of the formula (V) in the presence of a solvent under basic conditions.

The solvent which may be used in the process of the present invention can be selected from organic solvents such as methanol, ethanol, isopropanol, tert-butanol, Cellosolve, diethylene glycol, methylene chloride, chloroform, carbon tetrachloride, ether, tetrahydrofuran, acetone, benzene, toluene, xylene, pyridine, dimethyl sulfoxide, and dimethylformamide. Alternatively, an excess of the amine of the formula (III) and the compound of the formula (V) may be used as a reaction solvent in the steps. stepps.

The present reaction advantageously proceeds in the presence of a suitable basic reagent. Examples of the basic reagent include alkali metal salts such as sodium hydroxide, potassium hydroxide, sodium carbonate, potassium carbonate, sodium acetate and potassium acetate; alkali metal alcoholates such as sodium methylate, sodium ethylate and potassium ethylate; and tertiary organic bases such as triethylamine, dimethylaniline and pyridine.

The reaction may easily proceed at room temperature, but the reaction can be accelerated by heating.

According to the process of the present invention, there are produced such 3,4-dihydro-2(1H)-quinazolinone derivatives as shown below.

3-Methyl-4-hydroxy-4-phenyl-6-chloro-3,4-dihydro-2(1H)-quinazolinone 3-n-Propyl-4-hydroxy-4-phenyl-6-chloro-3,4-dihydro-2(1H)-quinazolinone 3-Allyl-4-hydroxy-4-phenyl-6-chloro-3,4-dihydro-2(1H)-quinazolinone 3-Cyclopropylmethyl-4-hydroxy-4-phenyl-6-chloro-3,4-dihydro-2(1H)-quinazolinone 3-(β-Ethoxyethyl)-4-hydroxy-4-phenyl-6-chloro-3,4-dihydro-2(1H)-quinazolinone 3-(β-Methylthioethyl)-4-hydroxy-4-phenyl-6-chloro-3,4-dihydro-2(1H)-quinazolinone 3-(β-Diethylaminoethyl)-4-hydroxy-4-phenyl-6-chloro-3,4-dihydro-2(1H)-quinazolinone 3-(β-Piperidinoethyl)-4-hydroxy-4-phenyl-6-chloro-3,4-dihydro-2(1H)-quinazolinone 3-(β-Morpholinoethyl)-4-hydroxy-4-phenyl-6-nitro-3,4-dihydro-2(1H)-quinazolinone 3-(p-Chlorophenyl)-4-hydroxy-4-phenyl-6-chloro-3,4-dihydro-2(1H)-quinazolinone 3-(m-Trifluoromethylphenyl)-4-hydroxy-4-phenyl-6-chloro-3,4dihydro-2(1H)-quinazolinone 3-(2′-Pyridyl)-4-hydroxy-4phenyl-6chloro-3,4-dihydro-2(1H)-quinazolinone 3-Ethyl-4-hydroxy-4-phenyl-6-methyl-3,4-dihydro-2(1H)-quinazolinone 3-Methyl-4-ethoxy-4-phenyl-6-chloro-3,4-dihydro-2(1H) -quinazolinone 3-Methyl-4-benzyloxy-4-phenyl-6-chloro-3,4-dihydro-2(1H)-quinazolinone 3-Methyl-4-methylthio-4-phenyl-6-chloro-3,4-dihydro-2(1H)-quinazolinone 3-Methyl-4-diethylamino-4-phenyl-6-chloro-3,4-dihydro-2(1H)-quinazolinone 3-Methyl-4-anilino-4-phenyl-6-chloro-3,4-dihydro-2(1H)-quinazolinone 3-Ethyl-4-ethoxy-4-phenyl-6, 8-dichloro-3,4-dihydro-2(1H)-quinazolinone 3-(β-Diethylaminoethyl)-4-methoxy-4-phenyl-6-chloro-3,4-dihydro-2(1H)-quinazolinone 3-(β-Piperidinoethyl)-4ethoxy-4-phenyl-6-nitro-3,4-dihydro-2(1H)-quinazolinone 3-(γ-Pyrrolidinopropyl)-4-ethoxy-4-phenyl-6-chloro-3,4-dihydro-2(1H)-quinazolinone 3-(γ-Piperidinopropyl)-4-(γ-piperidinopropylamino)-4-phenyl-6-chloro-3,4-dihydro-2(1H)-quinazolinone 3,4-Diphenyl-4-methoxy-6-chloro-3,4-dihydro-2(1H)-quinazolinone 3-Ethyl-4-ethoxy-4-phenyl-3,4-dihydro-2(1H)-quinazolinone 3-Ethyl-4-ethylamino-4-phenyl-8-chloro-3,4-dihydro-2(1H)-quinazolinone 3-(β-Dimethylaminoethyl)-4-methoxy-4-phenyl-6-methyl-3,4-dihydro-2(1H)-quinazolinone 3-(β-Diethylaminoethyl)-4-ethoxy-4-phenyl-6-nitro-3,4-dihydro-2(1H)-quinazolinone 3-(β-Piperidinoethyl)-4-ethoxy-4-phenyl-6-methoxy-3,4-dihydro-2(1H)-quinazolinone 3-Ethyl-4-ethoxy-4-(2′-thienyl)-3,4-dihydro-2(1H)-quinazolinone 3-Ethyl-4-methoxy-4-(2′-pyridyl)-6-chloro-3,4-dihydro-2(1H)-quinazolinone 3-(β-Diethylaminoethyl)-4-ethoxy-4-cyclohexyl-6-chloro-3,4-dihydro-2(1H)-quinazolinone 1,3-Dimethyl-4-ethoxy-4-phenyl-6-chloro-3,4-dihydro-2(1H)-quinazolinone 1-Methyl-3-(β-ethoxyethyl)-4-ethoxy-4-phenyl-6-chloro-3,4-dihydro-2(1H)-quinazolinone 1-Methyl-3-(β-morpholinoethyl)-4-ethoxy-4-phenyl-6-chloro-3,4-dihydro-2(1H)-quinazolinone 1-Allyl-3-ethyl-4-ethoxy-4-phenyl-6-chloro-3,4-dihydro-2(1H)-quinazolinone 1-(β-Ethoxyethyl)-3-(β-diethylaminoethyl)-4-phenyl-6-chloro-3,4-dihydro-2(1H)-quinazolinone 1-Cyclopropylmethyl-3-methyl-4-hydroxy-4-phenyl-6-chloro-3,4,-dihydro-2(1H)-quinazolinone 1-Cyclopropylmethyl-3-ethyl-4-methoxy-4-phenyl-6-nitro-3,4-dihydro-2(1H)-quinazolinone The present invention is further disclosed in the following Examples of preferred embodiments thereof, which are presented for the purpose of illustration and are not intended to limit the scope of the invention.

EXAMPLE 1

To a solution of 1.89 g of 2-trichloroacetamido-5-chlorobenzophenone in 50 ml of methanol were added 1.7 g of potassium hydroxide and 2.03 g of methylamine hydrochloride. After the mixture was allowed to stand at room temperature for two days, the solvent was removed under reduced pressure. Then, the mixture of ethanol and water was added to the residue. The precipitate formed was collected by filtration and recrystallized from ethanol-chloroform to give 2-trichloroacetamide-5-chloro-α-phenyl-benzylideneaminomethane as light yellow prisms, m.p. 254°C (decomp.).

Subsequently, to 20 ml of ethanol were added 0.59 g of 2-trichloroacetamido-5-chloro-α-phenylbenzylideneaminomethane thus obtained and 0.17 g of potassium hydroxide. The mixture was refluxed for one hour with stirring. The solvent was removed under reduced pressure and the residue washed with water, filtered and dried to give 3-methyl-4-ethoxy-4-phenyl-6-chloro-3,4-dihydro-2(1H)-quinazolinone.

The product was recrystallized from tetrahydrofuran-petroleum ether to obtain colorless prisms, m.p. >270°C.

EXAMPLE 2

Using the procedure similar to that described in Example 1, the mixture of 0.59 g of 2-trichloroacetamido-5-chloro-α-phenylbenzylideneaminomethane, 0.17 g of potassium hydroxide and 20 ml of methanol were reacted to obtain 3-methyl-4-methoxy-4-phenyl-6-chloro-3,4-dihydro-2(1H)-quinazolinone m.p. 195° – 196°C (decomp.).

EXAMPLE 3

To a solution of 3.77 g of 2-trichloroacetamido-5-chlorobenzophenone in 100 ml of ethanol was added 2.96 g of n-propylamine. The mixture was refluxed for 6 hours, then the solvent was removed under reduced pressure. To the residue was added the mixture of ethanol and water. The resulting insoluble crystals were collected by filtration and dried to give 1-(2-trichloroacetamido-5-chloro-α-phenylbenzylideneamino)propane. The product was recrystallized from ethanol-dimethylformamide to obtain light yellow fine crystals, m.p. 228° – 229°C (decomp.).

Subsequently, to 30 ml of benzene were added 0.84 g of 1-(2-trichloroacetamido-5-chloro-α-phenylbenzylideneamino)propane thus obtained, 0.08 g of sodium hydroxide and 0.05 ml of water. The mixture was then refluxed for one hour with stirring. The reaction mixture was concentrated and cooled. The separated crystals were collected by filtration, washed with water and dried to obtain 3-n-propyl-4-hydroxy-4-phenyl-5-chloro-3,4-dihydro-2(1H)-quinazolinone. The product was recrystallized from ethanol to obtain colorless prisms, m.p. 195° – 196°C (decomp.).

EXAMPLE 4

Using the procedure similar to that described in Example 3, but replacing n-propylamine with the corresponding amine, there were obtained the following 3,4-dihydro-2(1H))-quinazolinone derivatives;

- 3-Methyl-4-hydroxy-4-phenyl-6-chloro-3,4-dihydro-2(1H)-quinazolinone, m.p. 200°C (decomp.)
- 3-Ethyl-4-hydroxy-4-phenyl-6-chloro-3,4-dihydro-2(1H)-quinazolinone, m.p. 172° – 173°C
- 3-Allyl-4-hydroxy-4-phenyl-6-chloro-3,4-dihydro-2(1H)-quinazolinone, m.p. 179° – 180°C
- 3-Benzyl-4-hydroxy-4-phenyl-6-chloro-3,4-dihydro-2(1H)-quinazolinone, m.p. 230°C
- 3,4-Diphenyl-4-hydroxy-6-chloro-3,4-dihydro-2(1H)-quinazolinone, m.p. 169° – 170°C
- 3-(p-Tolyl)-4-hydroxy-4-phenyl-6-chloro-3,4-dihydro-2(1H)-quinazolinone, m.p. 181° – 182°C
- 3-(p-Methoxyphenyl)-4-hydroxy-4-phenyl-6-chloro-3,4-dihydro-2(1H)-quinazolinone, m.p. 177° – 178°C
- 3-(β-Piperidinoethyl)-4-hydroxy-4-phenyl-6-chloro-3,4-dihydro-2(1H)-quinazolinone, m.p. 202° – 203°C

What is claimed is:

1. A process for producing quinazolinone derivatives represented by the formula,

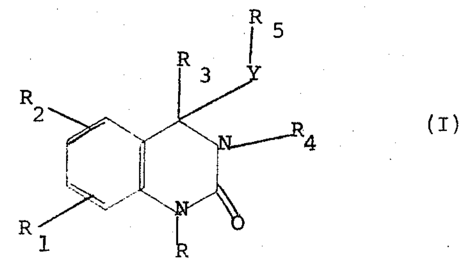

wherein R is hydrogen; $R_1$ and $R_2$ are independently hydrogen or halogen; $R_3$ is phenyl, $R_4$ is $C_{1-4}$ alkyl, $C_{3-5}$ alkenyl, benzyl, phenyl, $C_{1-4}$ alkylphenyl, $C_{1-4}$ alkoxyphenyl or piperidino-$C_{1-4}$ alkyl; $R_5$ is hydrogen or $C_{1-4}$ alkyl; and Y is oxygen, which comprises the step of reacting a compound of the formula,

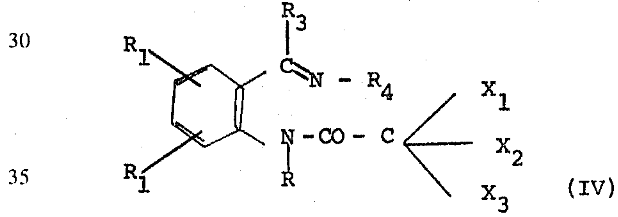

wherein $X_1$, $X_2$ and $X_3$ are the same or different halogen atoms and R, $R_1$, $R_2$, $R_3$ and $R_4$ are as defined above, with a compound of the formula, $$R_5 - YH \qquad (V)$$

wherein R and Y are as defined above in a solvent selected from the group consisting of methanol, ethanol, isopropanol, tert-butanol, Cellosolve, diethylene glycol, methylene chloride, chloroform, carbon tetrachloride, ether, tetrahydrofuran, acetone, benzene, toluene, xylene, pyridine, dimethyl sulfoxide and dimethylformamide.

2. A process according to claim 1, wherein the reaction is carried out in the presence of a basic reagent selected from the group consisting of sodium hydroxide, potassium hydroxide, sodium carbonate, potassium carbonate, sodium acetate, potassium acetate, sodium methylate, sodium ethylate, potassium ethylate, triethylamine, dimethylaniline and pyridine.

3. A process according to claim 1, wherein the alkali metal basic reagent is sodium hydroxide or potassium hydroxide.

4. A process for producing a quinazolinone derivative of the formula (I), wherein R, $R_1$, $R_2$, $R_3$, $R_4$, $R_5$ and Y are as in claim 1, which comprises the steps of reacting a trihalogenoacetanilide derivative represented by the formula,

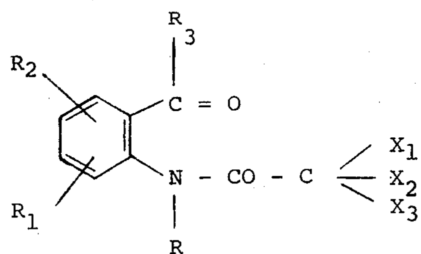

wherein $X_1$, $X_2$ and $X_3$ are the same or different halogen atoms; and R, $R_1$, $R_2$ and $R_3$ are as defined above, with an amine represented by the formula, $$R_4 - NH_2 \quad \text{(III)}$$

wherein $R_4$ is as defined above, or a salt thereof, and then reacting the resulting compound represented by the formula,

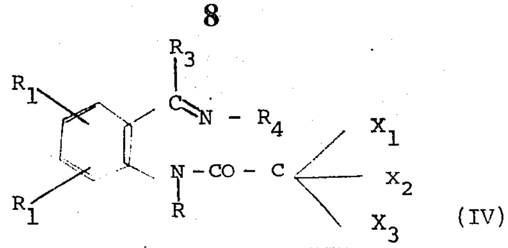

wherein R, $R_1$, $R_2$, $R_3$, $R_4$, $X_1$, $X_2$ and $X_3$ are as defined above, with a compound represented by the formula,

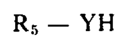

$$R_5 - YH \quad \text{(V)}$$

wherein $R_5$ and Y are as defined above.

5. A process according to claim 4, wherein the reaction between the trihalogenoacetanilide derivative of the formula (II) and the amine of the formula (III) is carried out in the presence of a solvent selected from the group consisting of methanol, ethanol, isopropanol, tert-butanol, Cellosolve, diethylene glycol, methylene chloride, chloroform, carbon tetrachloride, ether, tetrahydrofuran, acetone, benzene, toluene, xylene, pyridine, dimethyl sulfoxide and dimethylformamide.

* * * * *